US008572296B2

(12) United States Patent
Shasha et al.

(10) Patent No.: US 8,572,296 B2
(45) Date of Patent: Oct. 29, 2013

(54) DEVICE AND METHOD FOR ARBITRATING BETWEEN DIRECT MEMORY ACCESS TASK REQUESTS

(75) Inventors: Uri Shasha, Kiryat Ono (IL); Sagi Gurfinkel, Austin, TX (US); Gilad Hassid, Reshon Letzion (IL); Eran Kahn, Tel Aviv-Yaffo (IL); Yehuda Shvager, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/994,270

(22) PCT Filed: Jun. 30, 2005

(86) PCT No.: PCT/IB2005/052173
§ 371 (c)(1),
(2), (4) Date: Jul. 18, 2008

(87) PCT Pub. No.: WO2007/003984
PCT Pub. Date: Jan. 11, 2007

(65) Prior Publication Data
US 2009/0216917 A1  Aug. 27, 2009

(51) Int. Cl.
*G06F 13/28* (2006.01)
*G06F 13/36* (2006.01)

(52) U.S. Cl.
USPC ............... 710/22; 710/25; 710/26; 710/308; 718/100; 718/102; 718/103; 718/107

(58) Field of Classification Search
USPC ........ 710/22, 25, 26, 308; 718/100, 102, 103, 718/107
See application file for complete search history.

(56) References Cited

U.S. PATENT DOCUMENTS

| 4,502,117 A | | 2/1985 | Kihara |
| 4,556,952 A | | 12/1985 | Brewer et al. |
| 4,637,015 A | | 1/1987 | Bobey et al. |
| 4,837,677 A | | 6/1989 | Burrus et al. |
| 4,954,948 A | * | 9/1990 | Hira et al. ............. 718/107 |
| 5,450,551 A | | 9/1995 | Amini et al. |
| 5,485,613 A | * | 1/1996 | Engelstad et al. .......... 1/1 |

(Continued)

FOREIGN PATENT DOCUMENTS

| EP | 0716378 A | 6/1996 |
| EP | 1503292 A | 2/2005 |

(Continued)

OTHER PUBLICATIONS

Subtask Deadline Assignement for Complex Distributed Soft Real-Time Tasks by Ben Kao and Hector Garcia-Molina Copyright 1994.*

(Continued)

*Primary Examiner* — Henry Tsai
*Assistant Examiner* — Eric Oberly

(57) ABSTRACT

A method for arbitrating between direct memory access task requests, the method includes receiving multiple DMA task requests; the method is characterized by selecting a DMA task request out of the multiple DMA task requests in response to timing deadlines associated with the DMA tasks. A device that includes an interface, that is adapted to receive DMA task requests; the device is characterized by including an arbiter that is adapted to select a DMA task request out of the multiple DMA task requests in response to timing deadlines associated with the DMA tasks.

19 Claims, 9 Drawing Sheets

600

(56) References Cited

U.S. PATENT DOCUMENTS

| | | | |
|---|---|---|---|
| 5,506,969 | A | 4/1996 | Wall et al. |
| 5,603,050 | A | 2/1997 | Wolford et al. |
| 5,628,026 | A | 5/1997 | Baron et al. |
| 5,675,751 | A * | 10/1997 | Baker et al. .................. 710/305 |
| 5,692,216 | A | 11/1997 | Wolford et al. |
| 5,838,993 | A | 11/1998 | Riley et al. |
| 5,864,712 | A | 1/1999 | Carmichael et al. |
| 5,884,095 | A | 3/1999 | Wolford et al. |
| 6,026,443 | A * | 2/2000 | Oskouy et al. ................ 709/230 |
| 6,041,060 | A | 3/2000 | Leichty et al. |
| 6,122,679 | A | 9/2000 | Wunderlich |
| 6,298,396 | B1 | 10/2001 | Loyer et al. |
| 6,449,664 | B1 | 9/2002 | Honary et al. |
| 6,542,940 | B1 * | 4/2003 | Morrison et al. .............. 710/22 |
| 6,728,795 | B1 | 4/2004 | Farazmandnia et al. |
| 6,738,881 | B1 * | 5/2004 | Ollivier et al. ................ 711/168 |
| 6,741,603 | B2 | 5/2004 | Pate et al. |
| 6,975,629 | B2 * | 12/2005 | Welin ............................ 370/392 |
| 7,012,926 | B2 | 3/2006 | Weng et al. |
| 7,137,033 | B2 * | 11/2006 | Fifer et al. ...................... 714/20 |
| 7,239,645 | B2 | 7/2007 | Suri et al. |
| 7,324,541 | B2 | 1/2008 | Muthukrishnan et al. |
| 7,620,057 | B1 | 11/2009 | Aloni et al. |
| 7,813,369 | B2 | 10/2010 | Blackmore et al. |
| 2001/0007565 | A1 | 7/2001 | Weng et al. |
| 2002/0026544 | A1 | 2/2002 | Miura |
| 2002/0133661 | A1 | 9/2002 | Suzuki et al. |
| 2003/0088718 | A1 | 5/2003 | Higuchi |
| 2003/0149808 | A1 | 8/2003 | Burton et al. |
| 2004/0021618 | A1 | 2/2004 | Matko et al. |
| 2004/0037156 | A1 | 2/2004 | Yoneda et al. |
| 2004/0073721 | A1 | 4/2004 | Goff et al. |
| 2004/0123013 | A1 | 6/2004 | Clayton et al. |
| 2004/0216018 | A1 | 10/2004 | Cheung |
| 2005/0022187 | A1 * | 1/2005 | Park ............................ 718/100 |
| 2005/0114569 | A1 | 5/2005 | Bogin et al. |
| 2005/0125572 | A1 | 6/2005 | Ganapathy et al. |
| 2005/0149646 | A1 | 7/2005 | Kadatch et al. |
| 2005/0193256 | A1 | 9/2005 | Moyer |
| 2005/0210172 | A1 | 9/2005 | Gruber et al. |
| 2009/0125647 | A1 | 5/2009 | Shasha et al. |
| 2009/0144589 | A1 | 6/2009 | Shasha et al. |
| 2010/0064069 | A1 | 3/2010 | Shasha et al. |

FOREIGN PATENT DOCUMENTS

| | | |
|---|---|---|
| JP | 02048757 A2 | 2/1990 |
| JP | 04323755 A2 | 11/1992 |
| JP | 06187284 A2 | 7/1994 |
| JP | 07168741 A2 | 7/1995 |
| JP | 08249267 A2 | 9/1996 |
| JP | 2005085079 A | 12/2003 |
| JP | 2004013395 A2 | 1/2004 |
| JP | 2004252533 A2 | 9/2004 |
| JP | 2005158035 | 6/2006 |
| JP | 04324755 A2 | 9/2009 |
| WO | 2004086240 A | 10/2004 |
| WO | 2005013084 A2 | 2/2005 |
| WO | 2007003886 A1 | 1/2007 |
| WO | 2007003985 A1 | 1/2007 |
| WO | 2007003987 A1 | 1/2007 |

OTHER PUBLICATIONS

Global Priority-Driven Aperiodic Scheduling on Multiprocessors Andersson et al. Copyright 2003.*

Haifeng et al; "Optimal Partitioning for Quantized EDF Scheduling"; IEEE Real-Time Systems Symposium, Dec. 2002.

Rajkumar et al; "On Countering the Effects of Cycle-Stealing in a Hard Real-Time Environment"; Proceedings of the Real Time Symposiums, Dec. 1987.

Haifeng et al: "Optimal Partitioning for Quantized EDF Scheduling"; IEEE Real-Time Systems Symposium Dec. 2002.

Rajkumar et al: "On Countering the effects of cycle-stealing in a hard real-time environment"; Proceedings of the Real Time Symposiums, Dec. 1987.

Non-final Office Action mailed Dec. 9, 2011 for U.S. Appl. No. 11/994,278, 17 pages.

Final Office Action mailed May 17, 2012 for U.S. Appl. No. 11/994,278, 13 pages.

U.S. Appl. No. 11/994,273, Non-Final Office Action, mailed Aug. 3, 2010, 21 pages.

EPO Application No. 05758531, Office Action Rejection, dated Jun. 5, 2009, 4 pages.

McArthur et al., "Two-Dimensional DMA Buffer Examples for the MSC8101", May 2002, Digital DNA, 12 pages.

PCT International Application No. PCT/IB2005/052173, Search Report, dated Feb. 14, 2006, 3 pages.

PCT International Application No. PCT/IB2005/052174, Search Report, dated Feb. 14, 2006, 2 pages.

PCT International Application No. PCT/IB2005/052175, Search Report, dated Nov. 16, 2005, 3 pages.

PCT International Application No. PCT/IB2005/052176, Search Report, dated Nov. 8, 2005, 4 pages.

U.S. Appl. No. 11/994,273, Notice of Allowance, mailed Dec. 15, 2010, 6 pages.

U.S. Appl. No. 11/994,276, Final Office Action, mailed Aug. 31, 2010, 17 pages.

U.S. Appl. No. 11/994,276, Non-Final Office Action, mailed Apr. 30, 2010, 24 pages.

U.S. Appl. No. 11/994,276, Notice of Allowance, mailed Apr. 1, 2011, 9 pages.

U.S. Appl. No. 11/994,278, Final Office Action, mailed Dec. 10, 2009, 12 pages.

U.S. Appl. No. 11/994,278, Final Office Action, mailed May 13, 2011, 12 pages.

U.S. Appl. No. 11/994,278, Non-Final Office Action, mailed Jul. 9, 2009, 10 pages.

U.S. Appl. No. 11/994,278, Non-Final Office Action, mailed Dec. 9, 2010, 11 pages.

* cited by examiner

| ACTV 212 | SPRT 213 | DPRT 214 | SMDC 215 | DMDC 216 | SBDTP 217 | DBDTP 218 | RRPG 219 |

DMA CHANNEL CONFIGURATION REGISTER 210

| INTERNAL/EXTERNAL BUFFER DESCRIPTOR ENABLE 222 | ARBITRATION TYPE FIELD 224 |

DMA GLOBAL CONFIGURATION REGISTER 220

DMA CHANNEL ENABLE BITS

DMA CHANNEL ENABLE REGISTER 230

DMA CHANNEL DISABLE BITS

DMA CHANNEL DISABLE REGISTER 232

DMA CHANNEL FREEZE BITS

DMA CHANNEL FREEZE REGISTER 234

DMA CHANNEL DEFROST BITS

DMA CHANNEL DEFROST REGISTER 236

| CURRENT COUNTER 242 | THRESHOLD 244 | BASE COUNTER 246 |

DMA EDF REGISTER 240

DMA EDF MASK BITS

DMA EDF MASK REGISTER 250

DMA EDF STATUS BITS

DMA EDF STATUS REGISTER 254

DMA ERROR FIELDS

DMA ERROR REGISTER 260

*FIG. 4*

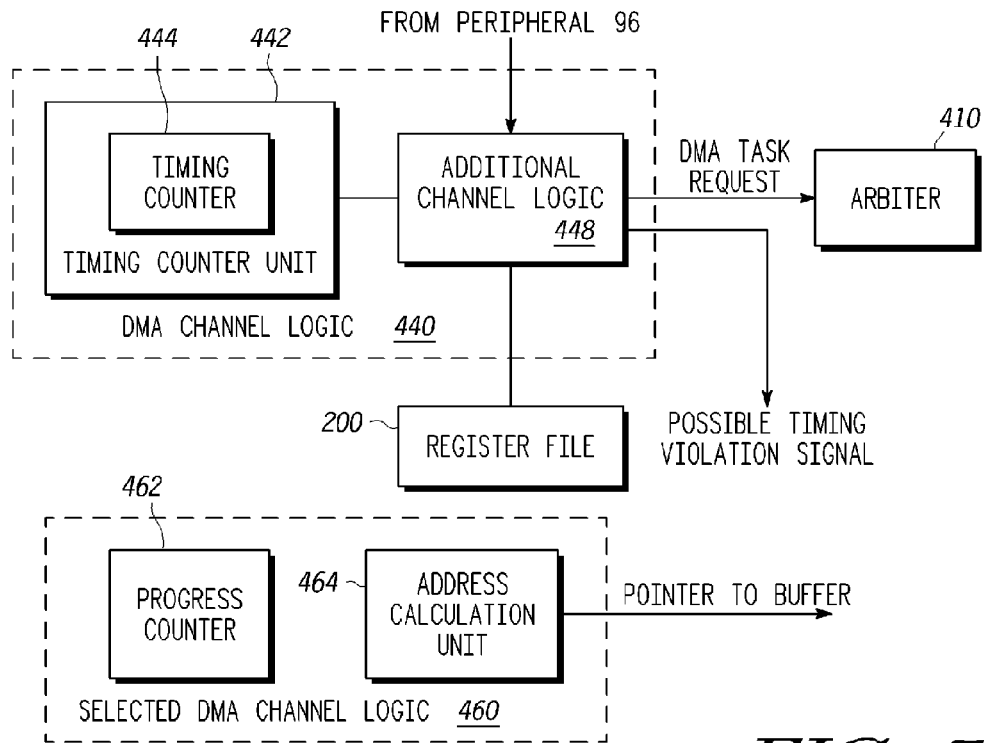
*FIG. 7*
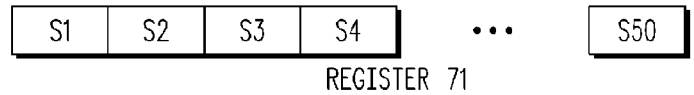
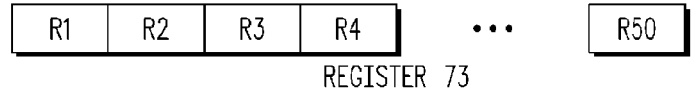
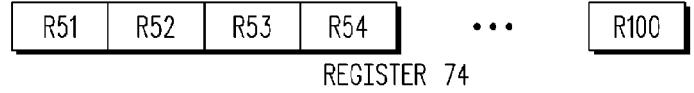
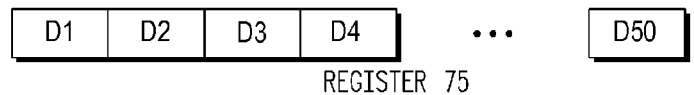
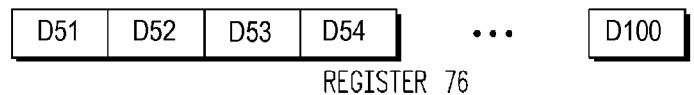
*FIG. 8*

DEVICE AND METHOD FOR ARBITRATING BETWEEN DIRECT MEMORY ACCESS TASK REQUESTS

FIELD OF THE INVENTION

The present invention relates to devices and methods for arbitrating between DMA task requests.

BACKGROUND OF THE INVENTION

The complexity of integrated circuits has dramatically increased during the last decade. System-on-chip and other multiple-core integrated circuits are being developed in order to support various applications such as but not limited to multimedia applications, real time applications and the like.

Modern integrated circuits are capable of executing a large amount of tasks substantially in parallel. Some of these tasks require to transfer relatively large amounts of data between memory mapped devices. Multiple channel Direct Memory Access (DMA) controller can manage multiple data transfers while reducing the load from the integrated circuit cores (processors). Nevertheless, DMA controllers can still load these cores by issuing an interrupt whenever certain DMA tasks are completed.

The following patents and patent applications, all being incorporated herein by reference, describe various DMA controllers: U.S. Pat. No. 6,738,881 of Olivier et al, U.S. Pat. No. 6,122,679 of Wunderlich, U.S. Pat. No. 5,450,551 of Amini et al., U.S. Pat. No. 6,728,795 of Farazmandnia et al., U.S. Pat. No. 4,502,117 of Kihara, U.S. Pat. No. 4,556,952 of Brewer et al., U.S. Pat. No. 5,838,993 of Riley at el., U.S. Pat. Nos. 5,692,216, 5,603,050 and 5,884,095 of Wolford et al., U.S. Pat. No. 6,298,396 of Loyer et al., U.S. Pat. No. 6,542,940 of Morrison et al., U.S. Pat. No. 6,041,060 of Leichty et al., U.S. patent applications serial number 2004/0073721A1 of Goff et al, U.S. patent applications serial number 20040037156A1 of Takashi et al., U.S. patent application publication number 2004021618A1 of Cheung, Japanese patent publication number JP07168741A2 of Hedeki et al., Japanese patent publication number JP06187284A2 of Masahiko, Japanese patent application publication number JP2004252533A2 of Yoshihiro, Japanese patent publication number JP04324755A2 of Tadayoshi et al., Japanese patent application publication number JP2004013395A2 of Hiroyuki, Japanese patent application publication number JP08249267A2 of Tetsuya, Japanese patent publication number JP02048757A2 of Katsuyuki et al., and PCT patent application publication number WO2005/013084 of Simon et al.

Due to the complexity of DMA tasks, and the large amount of DMA tasks developers spent many resources in defining the priority of each DMA task. These priorities can be tailored to specific programs.

There is a need to provide an efficient device and method for arbitrating between DMA task requests.

SUMMARY OF THE PRESENT INVENTION

A device and a method for arbitrating between DMA task requests, as described in the accompanying claims.

BRIEF DESCRIPTION OF THE DRAWINGS

The present invention will be understood and appreciated more fully from the following detailed description taken in conjunction with the drawings in which:

FIG. 4 illustrates various registers of file register, according to an embodiment of the invention;

FIG. 7 illustrates a DMA channel and a selected DMA channel logic, according to an embodiment of the invention;

FIG. 8 illustrates various buffers that are involved in a exemplary data transfer operation, according to an embodiment of the invention;

DETAILED DESCRIPTION OF PREFERRED EMBODIMENTS

Figure 1:
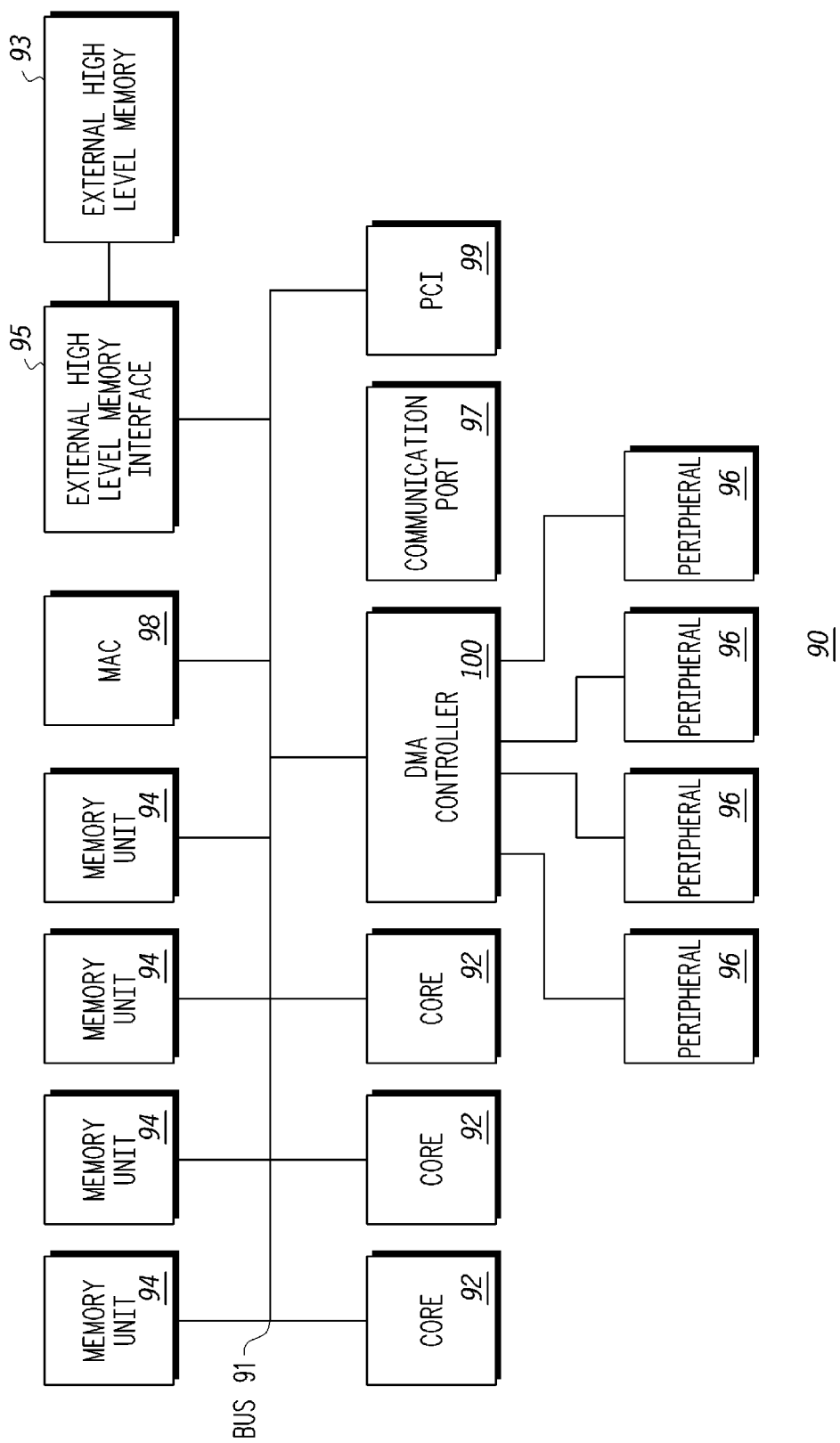
FIG. 1 illustrates a device, according to an embodiment of the invention.

The following figures illustrate exemplary embodiments of the invention. They are not intended to limit the scope of the invention but rather assist in understanding some of the embodiments of the invention. It is further noted that all the figures are out of scale.

A DMA task includes a transfer of information from one location to another. A DMA task may require many DMA transactions. The number of DMA transaction per DMA task is responsive to the relationship between the overall size of data that should be transferred during a DMA task and the size of data that can be transferred during a single DMA transaction. It is further noted that the number of DMA transactions can be responsive to the success of the DMA transactions, as failed DMA transactions can be followed by re-transmission of the data that was supposed to be transferred during the failed DMA transaction.

A single DMA task can include multiple DMA sub-tasks. A single DMA sub-task can include multiple DMA transactions. A DMA sub-task is associated with writing to (or reading from) a single dimension of a multidimensional buffer.

A cyclic DMA task can include multiple DMA task iterations. Each cyclic DMA task operation can include multiple DMA transactions and can include multiple DMA sub-tasks. A DMA iteration can be regarded as a DMA task that is repeated unless it is masked, frozen, disabled or otherwise halted.

A multidimensional buffer includes multiple buffer segments that are linked to each other. The segments can form a consecutive address range but is not necessarily so.

A buffer usually is associated with multiple logic components, such as registers. A multidimensional buffer requires less logic than a set of independent buffers (while each of these buffers corresponds to a single dimension of the multidimensional buffer). Conveniently, a multidimensional buffer includes multiple memory segments. The amount of memory segments is defined by size information of each dimension.

The size information of a certain dimension represents the ratio between the size of the pervious dimension and a current dimension. For example, if the first dimension includes Z basic memory segments, and a size information of the second dimension is Y then the dual dimension buffer includes (Z×Y) memory segments.

According to an embodiment of the invention multiple DMA tasks can be cyclic time based DMA tasks. A cyclic time based DMA task is a DMA task that is repetitive but its repetition rate is limited by a DMA task execution period. Conveniently only a single cyclic time based DMA task should be executed during a single DMA task execution period.

According to an embodiment of the invention a large amount of DMA tasks can be defined as cyclic time based DMA tasks, thus reducing the complexity of the preprogramming of the DMA controller. Also, using cyclic time based DMA tasks prevents to program the DMA controller each cycle.

Conveniently, a device (such as device 90 of FIG. 1) is provided. The device includes at least one memory unit and a DMA controller that is adapted to access the memory unit. The device 90 is adapted to implement multidimensional buffers within the at least one memory unit. The device includes a DMA controller 100 that is adapted to execute multiple DMA sub-tasks, wherein the execution comprises jumping between buffers at inter-buffer jumping points; and wherein the inter-buffer jumping points are defined at substantially an end of one or more dimensions of each multidimensional buffer out of a plurality of multidimensional buffers.

Conveniently, a device (such as device 90 of FIG. 1) is provided. The device 90 includes one or more memory units (such as memory units 93, and 94 of FIG. 1). The device 90 also includes a DMA controller 100 that is adapted to: (i) access at least one buffer descriptor out of multiple buffer descriptors defined for each of a plurality of DMA channel, wherein at least two buffer descriptors comprise timing information that controls an execution of cyclic time based DMA tasks; (ii) receive multiple DMA task requests, (iii) select a DMA task request out of the multiple DMA task requests, and (iv) execute a DMA task or a DMA task iteration and update a buffer descriptor associated with the selected DMA task request to reflect the execution.

The following description describes various counters. Those of skill in the art will appreciate that count up as well as count down counters can be used without departing from the scope of the invention. Accordingly, a counter increment operation can be replaced by a counter decrement operation.

The following FIGs., for purposes of clarity, do not include certain details which persons of skill in the art understand are required in an actual system. For example, some control paths and power supply paths are not shown. These will be apparent from the further description below. In general, there are many possible ways to implement the logical functions of system 90 and DMA controller 100 in hardware and the figures are only intended for purposes of illustration. Persons of skill in the art will understand how to implement system 90 and especially DMA controller 100 based on the description herein.

FIG. 1 illustrates a system 90, according to an embodiment of the invention. System 90 includes DMA controller 100 as well as additional components.

Conveniently, system 90 has a first DMA task controlling capability. It includes a memory unit and a DMA controller that is adapted to monitor an execution of the first DMA task that involves an access to the memory unit, and to perform a first possible timing violation responsive operation if the first DMA task was not completed during a first DMA task execution sub-interval.

DMA controller 100 can be connected to multiple memory mapped components and can be a part of various system on chip systems. The inventors used a thirty two channel DMA controller 100, but the number of DMA channels can be altered. Multiple registers and logic are associated with each DMA channel. Conveniently, multiple components such as but not limited to peripherals, cores and memory units can be connected to the DMA controller 100. Conveniently, the DMA controller can dynamically select which components to service. Thus the mere connection between the DMA controller and a component does not necessarily mean that that a DMA channel is allocated to that component.

Bus 91 is connected to the DMA controller 100, media access controller (denoted MAC) 98, multiple cores 92, multiple memory units 94, external high level memory interface 95, and communication ports such as Ethernet port 97 and PCI 99. In addition, multiple (M) peripherals 96, are connected to the DMA controller 100.

It is noted that different ports of the DMA controller 100 can be connected to different buses, and that bus 91 can be replaced by multiple busses, each conveniently having its own MAC.

System 90 includes multiple memory units, including internal memory units (not shown) within the DMA controller 100. Various information can be stored in various memory units. Conveniently, buffer descriptors stored in memory units 94. It is noted that at least one buffer descriptor can be stored within the DMA controller 100 itself, but this is not necessarily so. The buffers that are pointed by the buffer descriptors can be implemented within memory units 94 or the external high level memory unit 93.

The buffer descriptors are programmed in advance and include information that controls the DMA tasks.

Figure 2:
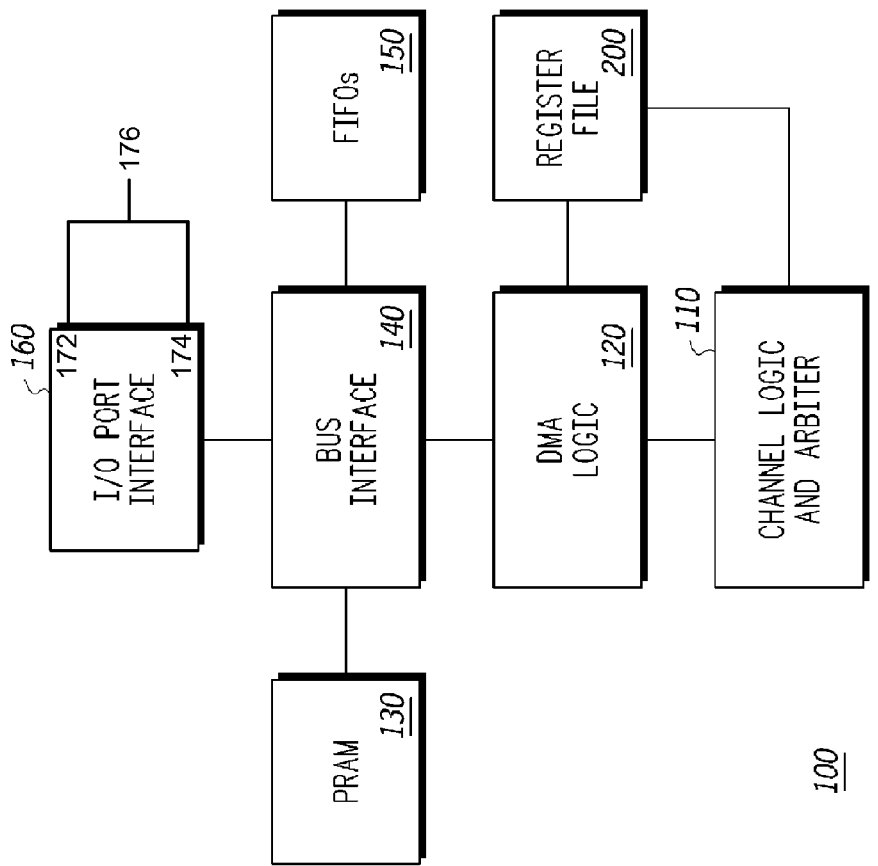
FIG. 2 illustrates a DMA controller, according to an embodiment of the invention.

FIG. 2 illustrates a DMA controller 100, according to an embodiment of the invention.

DMA controller 100 includes two I/O ports 172 and 174, I/O port interface 160, bus interface 140, multiple FIFOs 150, PRAM 130, DMA logic 120, channel logic and arbiter 110 and a register file 200.

The DMA logic 120 is connected to the bus interface 140, channel logic and arbiter 110, register file 200, a parametric RAM (PRAM) 130 and FIFOs 150. The PRAM 130 is connected to the bus interface 140 and to the channel logic and arbiter 110. The register file 200 is connected to the channel logic and arbiter 110. The FIFOs 150 are connected to the bus interface 140. I/O port interface 160 is connected to I/O ports 172 and 174, and to the bus interface 140.

It is noted that DMA controller 100 can include a bus interface and/or an I/O port interface for each I/O port, but for simplicity of explanation only one I/O port interface 160 and a single bus interface 140 are illustrated.

The two I/O ports 172 and 174 are connected to bus 176 that in turn is connected to external memory units such as memory units 94. The dual I/O ports facilitate an execution of two DMA tasks in parallel. It is noted that the amount of I/O ports can differ from two.

Memory units 94 store buffer descriptors and are also used to implement buffers. These buffers can include single dimensional buffers or multidimensional buffers. Multidimensional buffers include multiple address ranges that are linked to each other. It is noted that the buffer descriptors can be stored in one or more memory units while one or more other memory units are used to implement the buffers. The buffer descriptors define various characteristics of the DMA tasks, such as the location of a buffer, the remaining data to be transferred in order to complete a DMA task or a DMA sub-task (said size also referred to as residual size), the number of buffer dimensions, timing of the DMA tasks, operations to perform once the DMA task ends and/or the buffer is full or empty, and the like.

For example, the buffer descriptor can include instructions or control information that cause the DMA controller to perform one of the following operations once the buffer is full: (i) shut down the DMA channel (for example by preventing that DMA channel to send DMA task requests to the arbiter), (ii) reinitialize (thus implementing a cyclic buffer), (iii) reinitialize once a certain re-write period expires (thus implementing a time-based cyclic buffer), (iv) reinstall the buffer size (thus implementing an incremental buffer), or (v) switch to another buffer (thus implementing a chained buffer), and the like.

Conveniently, the buffer descriptors are defined by a user or by another entity and are stored in one or more memory units 94. Each DMA channel can be associated with multiple buffer descriptors. These buffer descriptors can be arranged in various manners, such as but not limited to buffer descriptor tables (BDT). Each DMA channel can be associated with a unique BDT.

Various data retrieval methods can be applied in relation to the buffer descriptors. Conveniently, at the first time a certain DMA task request is selected by the arbiter, the associated buffer descriptor is retrieved from the memory units 94. The buffer descriptor is then stored in the PRAM 130, updated by the DMA controller 100, and eventually written back to the memory units 94. Said write back operation can occur when the DMA task ends, but this is not necessarily so.

Referring to FIG. 7, the channel logic and arbiter 110 includes an interface 420 and an arbiter 410. It receives DMA task requests from various memory-managed components, such as but not limited to peripherals 96, and performs an arbitration sequence to select one out of these DMA task requests.

The interface 420 can be adapted to check whether a DMA task can be serviced (if the associated DMA task request wins the arbitration session) before sending the DMA task request to the arbiter 410. This check can involve determining whether the DMA channel is enabled, not frozen, the I/O port can be serviced, and/or whether the DMA task request is not temporarily masked, and the like.

A DMA task request can be temporarily masked if, for example, a certain DMA task is time-based cyclic DMA task and if during a predefined DMA task period a previous DMA task was executed.

According to an embodiment of the invention the arbiter 410 is adapted to select a DMA task request out of the multiple DMA task requests in response to timing deadlines associated with the DMA tasks. Conveniently, the arbiter 410 is adapted to select between DMA task requests associated with substantially the same timing deadlines in response a to predefined priority.

Conveniently, the arbiter 410 is adapted to select between DMA task requests associated with substantially same timing deadlines by applying a timing indifferent arbitration scheme. Such an arbitration scheme is not responsive to the timing deadline and can include any of the well known prior art arbitration schemes such as round robin, weighted round robin, fixed priority, dynamically assigned priority, weighted fair queuing, low latency queuing, and the like. The dynamically assigned priority can change a priority of the DMA requests each one or more arbitration cycle. At least some of these arbitration schemes can limit the amount of bandwidth consumed by a certain DMA channel.

Conveniently, the arbiter 410 is adapted to select a DMA task in response to at least one available bandwidth parameter (ABP). The available bandwidth parameter can be the number of devices that are connected to a bus that is also connected to the DMA controller 100, the bus bandwidth, the state of that bus (whether the bus is busy), and the like. According to an embodiment of the invention the arbiter ignores DMA task requests that can not be executed once the arbitration ends. For example, some DMA tasks require that a bus is not busy and that a data recipient is available. If these conditions are not fulfilled the arbiter 410 can ignore a DMA request that involves transferring data over the busy bus and/or to a busy data recipient.

Conveniently, the arbiter 410 is adapted to select a DMA task in response to at least one requested bandwidth parameter (RBP). The requested bandwidth parameter can be the number of data transfer operations that are required for completing the DMA task, the size of data that is transferred during each data transfer, and the like.

According to an embodiment of the invention the arbiter 410 can select a DMA task in response to one or more RBP and one or more ABP.

According to an embodiment of the invention each DMA task can be associated with one of the I/O ports 172 and 174. In such a case the arbiter 410 can perform two independent arbitrations sessions. The first arbitration session selects a DMA task that is associated with I/O port 172 while the other session selects a DMA task that is associated with I/O port 174. Both arbitration sessions can be executed in parallel.

According to another embodiment of the invention the DMA tasks are not initially associated with certain I/O ports. In this case the arbiter 410 can select two DMA tasks and then the DMA controller 100 will decide which the I/O ports that will service the DMA tasks.

According to an embodiment of the invention the arbitration process includes two stages. During the first stage the arbiter 410 sorts the DMA tasks to predefined timing deadlines ranges. Then, the arbitrator selects between the DMA tasks that are associated with the shortest timing deadline range. The inventors used an eight-bit timing deadline value and four timing deadline ranges (zero and one), (two to seven), (eight to sixty three) and (sixty four to two hundred and fifty five), but other ranges can be defined.

The DMA controller 100 include multiple FIFOs 150. Conveniently one FIFO is allocated to each DMA channel. The status of the FIFOs can be provided to the DMA logic 120 that can, in response to the status, send one or more DMA requests to the channel logic and arbiter 110. For example, if a certain FIFO is empty the DMA logic 120 can decide to fill it (by performing write operations) and when it is full the DMA logic can decide to empty it (by performing read operations). The channel logic and arbiter 110 can decide to arbitrate between the DMA tasks or temporarily ignore them in response to the DMA channel status (frozen, disabled, defrosted, enabled), the I/O port availability, the current capability of a component associated with the DMA channel to participate in a DMA transfer and the like.

It was previously mentioned that a DMA task request does not enter the arbitration session if the I/O port that should be used during the DMA task is busy. It is noted that various parts of the DMA controller can perform this check. According to another embodiment of the invention the status of the I/O port is not checked and if such a DMA task request wins the arbitration session it can be stored within an internal queue of the DMA controller 100, be ignored or temporarily ignored.

Figure 3:
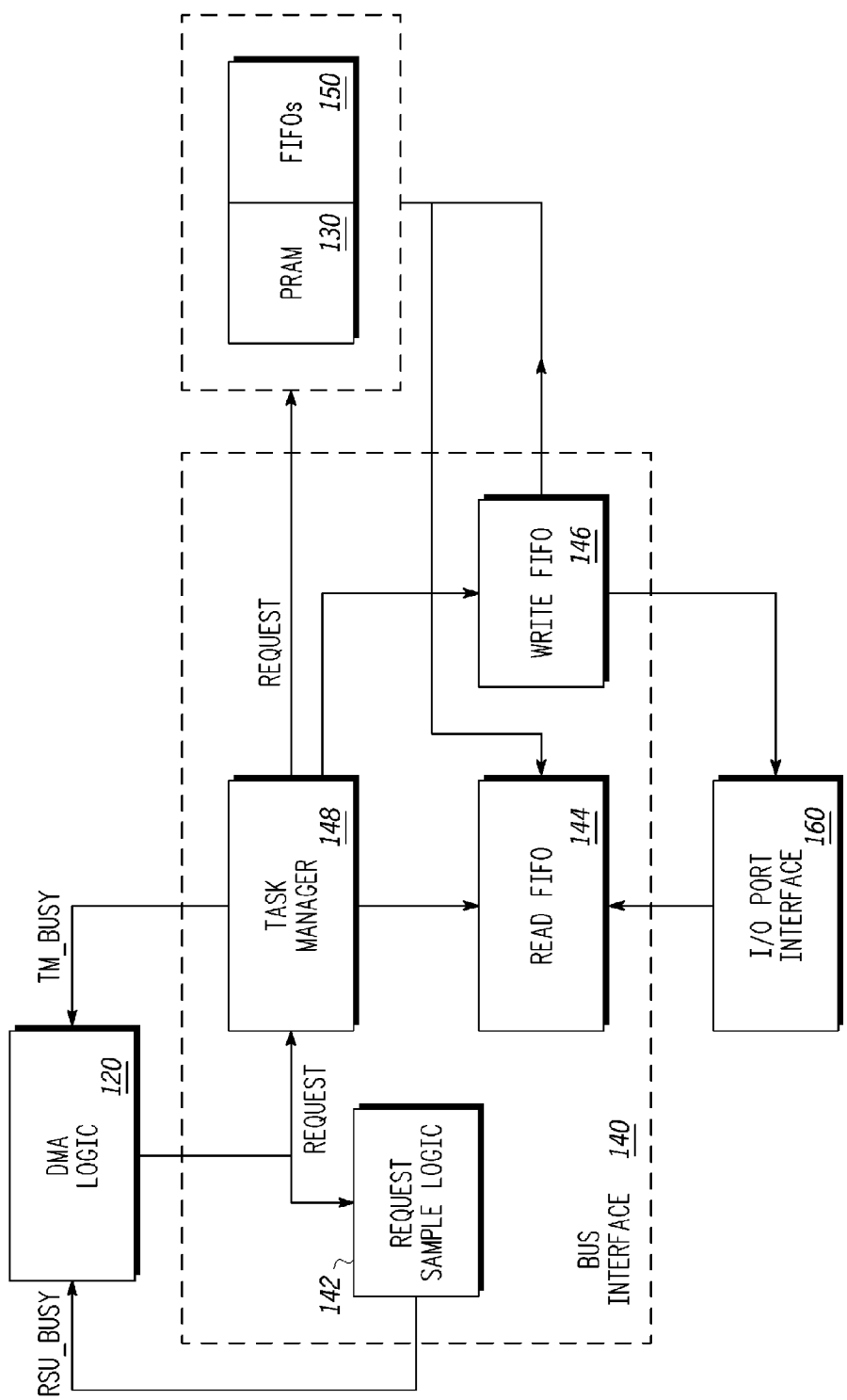
FIG. 3 illustrates a bus interface, according to an embodiment of the invention.

FIG. 3 illustrates bus interface 140, according to an embodiment of the invention. The bus interface 140 includes a DMA task request sample unit (RSU) 142, a write FIFO 144, a read FIFO 146 and a task manager 148. The RSU 142 samples DMA task requests provided by the DMA logic 120 and sends them to the I/O port interface 160.

The RSU 142 samples the DMA task requests sent by the DMA logic. Once a DMA task request is detected it is sent to the I/O port interface 160. If the I/O port associated with the DMA task request is not busy then the request is serviced. Conveniently, the request is serviced after one clock cycle, but this is not necessarily so.

If the I/O port associated with the DMA task request is busy the RSU 142 can send a RSU-busy signal to the DMA logic 120. Conveniently, the DMA task request is stored in a queue of the task manager 148, until it is serviced.

The task manager 148 includes a queue that can store few (such as eight) DMA task requests. Once the queue of the task manager 148 is full it sends a task-manager-busy indication signal to the DMA logic in order to temporarily block new requests from the DMA logic. It is noted that a queue can be allocated to each I/O port.

The bus interface 140 includes an internal read FIFO 146 and write FIFO 148. These FIFOs relax timing constraints and provide a pipelined structure for read and write operation through the I/O port interface 160 and I/O ports 172 and 174.

FIG. 4 illustrates various registers of file register 200, according to an embodiment of the invention.

According to an embodiment of the invention the file register 200 includes one or more shadow registers. A shadow register is associated with a corresponding register and can allow to update the content of that register even when the register is being utilized.

File register 200 includes multiple programmable registers, such as DMA buffer descriptor base registers, DMA channel configuration registers 210, DMA global configuration register 220, DMA channel enable register 230, DMA channel disable register 232, DMA channel freeze register 234, DMA channel defrost register 236, DMA EDF resisters 240, DMA EDF mask register 250, DMA EDF status register 254, DMA error register 260, as well as various debug registers, profiling registers, additional status registers and update registers.

Each DMA channel is associated with a buffer descriptor table (BDT). The BDT includes multiple buffer descriptors. Each DMA channel has a DMA buffer descriptor base register, such as register 202 that stores the base address of the buffer descriptor table of that DMA channel.

Each DMA channel is associated with a DMA channel configuration register, such as DMA channel configuration register 210. It includes the following fields: DMA channel active (ACTV) field 212, source I/O port (SPRT) field 213, destination I/O port (DPRT) field 214, source multidimensional (SMDC) field 215, destination multidimensional (DMDC) field 216, source BDT pointer 217, destination BDT pointer 218, round robin priority group (RRPG) field 219. In addition these registers can include fields such as source/destination latency or utilization optimization scheme, and the like.

ACTV 212 indicates if the DMA channel is active or not. SPRT 213 indicates the source I/O port, and DPRT 214 indicates the destination I/O port. SMDC 215 indicates if the source buffer is a multidimensional buffer. DMDC 216 indicates if the destination buffer is a multidimensional buffer.

The source BDT pointer 217 includes an offset within a BDT to the source buffer descriptor. The destination BDT pointer 218 includes an offset within a BDT to the destination buffer descriptor. The address of a selected buffer descriptor is calculated from the buffer descriptor base address and the offset.

The RRPG 219 indicates the priority of the DMA channel in a round robin arbitration scheme.

DMA global configuration register 220 includes various fields such as internal or external buffer descriptor enable field 222, arbitration type field 224, and the like. The arbitration type field is configured such as to select between multiple available arbitration schemes. These arbitration schemes can include, for example, timing deadlines based arbitration scheme, timing deadline indifferent arbitration scheme, and/or a combination of both.

The DMA channel enable register 230 includes multiple bits. Each set bit indicates that the associated DMA channel is enabled. Reset bits are ignored. The DMA channel disable register 232 includes a bit for each DMA channel. If that bit is set then the DMA channel is disabled. Reset bits are ignored. DMA channel freeze register 234 includes a bit for each DMA channel. If that bit is set then the DMA channel is frozen. The difference between a frozen DMA channel and a disabled DMA channel is that the requests of a frozen DMA channel are considered but not serviced while requests of a disabled DMA channel are ignored. The DMA channel settings of a frozen DMA channel are not changed and remain valid. The DMA channel defrost register 236 includes a bit for each DMA channel. If that bit is set then the DMA channel is defrosted—it exits the freeze status.

Each DMA channel is associated with a DMA EDF register, such as DMA EDF resister 240. It includes three timing fields. The first timing field is referred to as current counter field 242 and it stores the current value (current time) of a timing counter that is associated with the DMA channel. The second timing field is referred to as threshold field 244 and it stores a threshold value that reflects the value of the timing counter when the DMA task is due. The third timing field is referred to as base counter field 246 and it stores a base counter value that is loaded to the counter when the timing counter is initialized. The DMA task execution period conveniently reflects the difference between the base counter value and the threshold value. A timing deadline reflects the difference between the current counter value and the threshold value.

Conveniently once a DMA channel is disabled the timing counter associated with that DMA channel halts. When the DMA channel is enabled the timing counter of that channel is reloaded with the base counter value.

DMA EDF mask register 250 includes multiple bits that can either enable or mask a generation of an interrupt request once a timing deadline occurs or is about to occur. According to an embodiment of the invention an occurrence of a possible timing violation can be indicated if a certain DMA task was not completed within a predefined sub-period of a DMA task execution period. The sub-period can be defined by a sub-period threshold. Once this threshold is passed the DMA controller 100 or another device (such as core 92) can perform at least one of the following operations: (i) delete the DMA task, (ii) increase the priority of the DMA task, (iii) force the execution of the DMA task, (iv) allow more than a single DMA task to be executed during the next DMA task execution period, if this is a cyclic time based DMA task, (v) force the execution of one or more DMA transactions, (vi) force the execution of one or more DMA sub-task, and the like.

The DMA EDF status register 254 indicates whether one or more timing violations occurred. The DMA error register 260 includes multiple fields that indicate the occurrence of various errors. These errors can include various I/O port errors, address errors, PRAM parity check failures, FIFO errors, timing violation errors, and the like.

Figure 5:
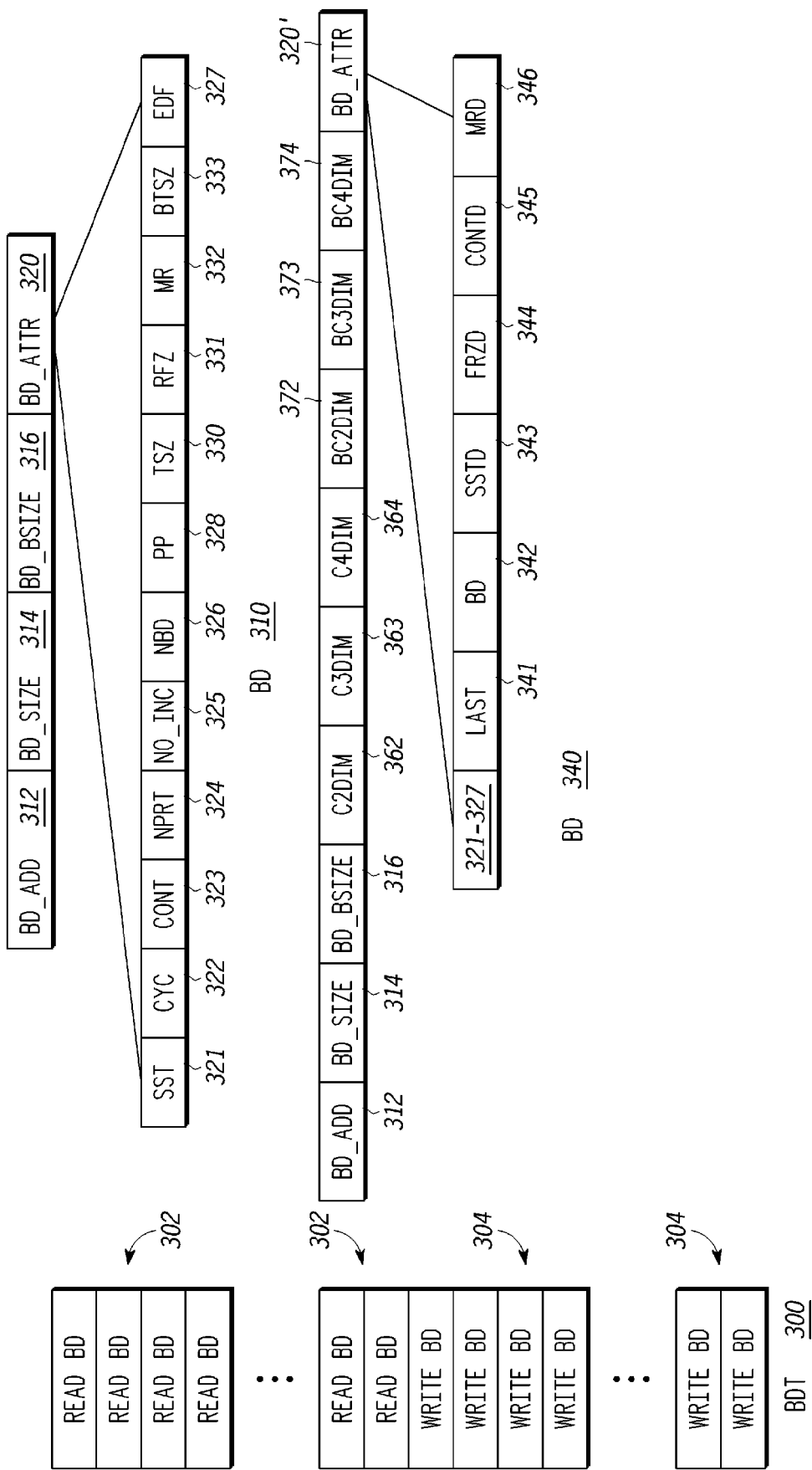
FIG. 5 illustrates a buffer descriptor table according to an embodiment of the invention.

FIG. 5 illustrates a buffer descriptor table 300 according to an embodiment of the invention.

Each DMA channel is associated with a buffer descriptor table (BDT). BDT 300 is conveniently stored within one or more memory units 94 and starts at a BTD base address. BDT 300 includes a list of buffer descriptors that can be associated with various DMA tasks of the DMA channel. The BDT 300 is programmed in advance although it can be updated in various manners.

Conveniently, there are read buffer descriptors and write buffer descriptors. Each of these buffer descriptors can be a single dimensional buffer descriptor or a multidimensional buffer descriptor.

BDT 300 includes multiple read buffer descriptors collectively denoted 302 and multiple single dimensional write buffer descriptors collectively denoted 304. It is noted that the read buffer descriptors can include one or more single dimensional buffer descriptors and/or one or more multidimensional buffer descriptors. The write buffer descriptors can include one or more single dimensional buffer descriptors and/or one or more multidimensional buffer descriptors.

It is noted that each BDT can include a large number of buffer descriptors. The inventors used a DMA controller that had up to one thousand and twenty four single dimensional write buffer descriptors, but other amounts and types of buffer descriptors can be used. Conveniently if only a small amount of buffer descriptors are used then these buffer descriptors can be stored within the DMA controller 100.

A single dimensional buffer descriptor, such as ED 310 includes four fields, BD_ADD 312, BD_SIZE 314, BD_B-SIZE 316 and BD_ATTR 320. Each field is thirty two bits long. BD_ADD 312 includes a pointer that points to the current buffer entry. The pointer scans the buffer and is incremented on every DMA transaction. BD_SIZE 314 indicates the size of the remaining data to be transferred in order to complete a DMA task or a DMA sub-task. This value is decremented by a DMA transaction size every time a DMA transaction is completed. Conveniently, a DMA task is completed when this field reaches zero. BD_BSIZE 308 stores the base size (aggregate size of data to be transferred during the whole DMA task) of the buffer.

BD_ATTR 320 includes the following fields: (i) SST 321 that indicates whether to generate a masked interrupt request when a DMA task ended, (ii) CYC 322 that indicates whether the buffer is cyclic or incremental, (iii) CONT 323 that indicates whether to close the buffer when BD_SIZE reaches zero, (iv) NPRT 324 that indicates which I/O port to use during the next DMA task, (v) NO_INC 325 that indicates whether to increment the buffers address (usually by altering the buffer offset) after a DMA task is completed, (vi) NBD 326 that selects the buffer that will be used for the next DMA task, (vii) PP 328 that sets the buffers priority that can be taken into account by MAC 98, (viii) TSZ 330 that indicates the maximal amount of data that can be transferred during a single DMA task, (ix) RFZ 331 that indicates whether to freeze a buffer once BD_SIZE reaches zero, (x) MR 332 that indicates whether to mask requests from the DMA channel until the data sent by the DMA controller reaches its destination, (xi) BTSZ 333 that indicates the DMA transaction size, and (xii) EDF 327 that indicates, if timing deadline based arbitration is selected, how to activate the buffer once BD_SIZE reaches zero.

EDF 327 can indicate whether (a) the DMA channel and the arbiter can continue to work normally (in a continuous manner), (b) the EDF counter should be loaded with the base counter value, or (c) the DMA task requests of that DMA channel can be masked until a predefined time period lapses from the start of the task (for example the EDF counter reaches zero). Once the latter occurs the counter is loaded with the base counter value.

For convenience of explanation a four dimensional buffer and a four dimensional buffer descriptor 340 are illustrated. It is noted that a multidimensional buffer can have two, three or more than four dimensions. A DMA task of a four-dimensional buffer includes four DMA sub-tasks.

The multidimensional buffer descriptor 340, includes the fields of the single dimensional buffer descriptor as well as additional fields. It also includes more attribute fields then the single dimensional buffer descriptor.

When using a multidimensional buffer descriptor each dimension (DMA sub-task) can be monitored separately. Thus, instead a single value (BD_SIZE) that indicates the remaining size of data to be transferred during a DMA task, there are three additional counters that count the remaining repetitions of first dimension (C2DIM 362), the remaining repetitions of the second dimension (C3DIM 363) and the remaining repetitions of the third dimension (C4DIM 364), such as to complete the second, third and fourth dimensions. In addition, each additional dimension has its own offset (instead of the single dimensional BD_ADD 312 field), and its repetition base count (BC2DIM 272, BC3DIM 273 and BC4DIM 274) that indicate the overall number of repetitions of each of the second, third and fourth dimensions.

The additional attribute fields, in addition to fields 321-327 belong to attribute field 320' and include: LAST 341, BD 342, SSTD 343, FRZD 344, CONTD 345, and MRD 346.

LAST 341 indicates if the buffer is the last one in a chain of chained buffers (and if so the DMA channel is closed once the buffer is filled (write operation) or emptied (read operation). BD 342 indicates the number (such as four) of dimensions of the buffer. SSTD 343 indicates whether a completion of the first, second, third or fourth DMA sub-tasks will set a completion status bit. FRZD 344 indicates whether a completion of the first, second, third of fourth DMA sub-task will cause the DMA controller to freeze the DMA channel. CONTD 345 defines inter-buffer jumping points by indicating when the DMA channel will switch to the next buffer descriptor—after a completion of the first, second, third or fourth DMA sub-task. CONTD 345 facilitates to switch buffers before the whole DM task is completed. MRD 346 indicates when DMA channel requests are masked.

Figure 6:
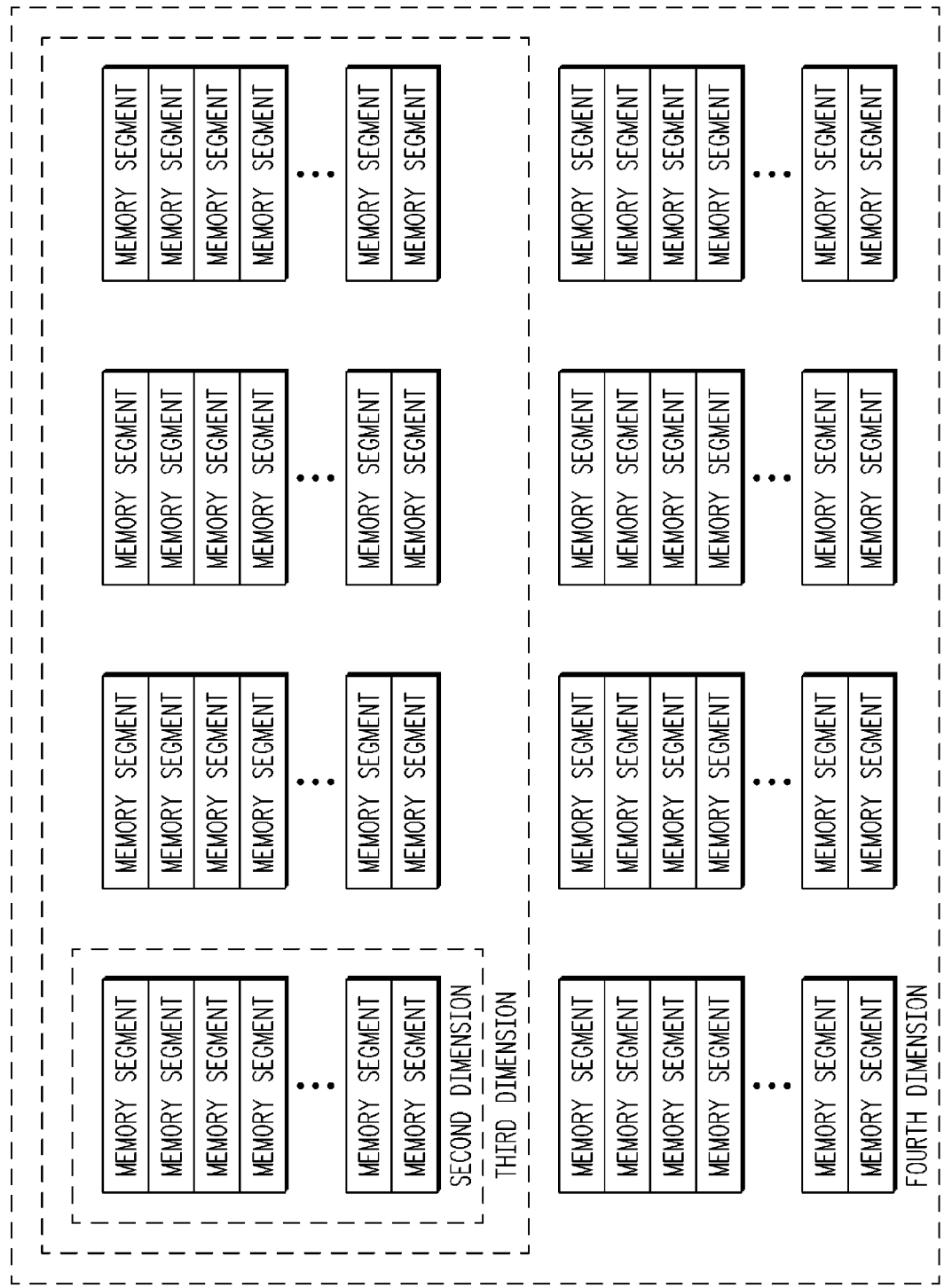
FIG. 6 illustrates a four-dimensional buffer, according to an embodiment of the invention.

FIG. 6 illustrates a four-dimensional buffer 350, according to an embodiment of the invention.

Buffer 350 includes 128×256×128 memory segments of sixty four bytes. The offset between consecutive memory segments that belong to the first dimension is four hundred and forty-eight bytes. Thus, BD_BSIZE equals sixty four, BC2DIM equals one hundred and twenty eight, BC3DIM equals two hundred and fifty six, and BC4DIM equals one hundred and twenty eight.

The whole buffer can include multiple inter-buffer jumping points that correspond to end points of various dimensions. For example, a first set of possible inter-buffer jumping points can be located at the end of each memory segment (corresponding to the size of the first dimension). A second set of possible inter-buffer jumping points can be located each one hundred and twenty eight memory segments (corresponding to the size of the first dimension). A third set of possible inter-buffer jumping points can be located each 32768 memory segments (corresponding to the size of the third dimension).

Inter-buffer jumping points can be defined, for example, at either one of these possible end points. The selection between inter-buffer jumping points is responsive to the value of CONTD 345. If, for example COND equals one then the process jumps whenever a memory segment is accessed. Thus, if there are multiple multidimensional buffers such as 350 then the first dimension of each of these buffers is accessed, then the second dimension of each of these buffer is accesses, until all dimensions are accessed. If, for example COND 345 equals two then the second set of inter-buffer jumping points is selected.

It is noted that according to an embodiment of the invention the jumping is responsive to a determination to continue the DMA task. In some cases once a certain inter-buffer point is reached device 90 determines whether to proceed in view of at least one parameters such as the content of the received information, the success of the pervious DMA sub-tasks, and the like.

If the four-dimensional buffer 350 is defined as a cyclic buffer then the first memory segment is accessed after the last memory segment is accessed.

FIG. 7 illustrates DMA channel logic 440 and selected DMA channel logic 460, according to an embodiment of the invention.

DMA controller 100 can manage multiple DMA channels. For simplicity of explanation FIG. 7 illustrates DMA channel logic 440 and selected DMA channel logic 460, that manage a single DMA channel.

DMA channel logic 440 is located within channel logic and arbiter 110. The channel logic and arbiter 110 includes such logic for each DMA channel.

Selected DMA channel logic 460 is located within DMA logic 120. The DMA logic 120 includes a single DMA channel logic 460 that manages the selected DMA task requests. If, for example, the DMA controller 100 is adapted to manage more than one DMA task at substantially the same time it should include additional logics such as logic 460. For example, if DMA controller 100 is adapted to manage one DMA task per I/O port (172 and 174) then it should include two selected DMA channel logics.

DMA channel logic 440 includes a timing counter unit 442, and additional channel logic 448.

The timing counter unit 442 includes at least one timing counter, such as timing counter 444 that counts time that passed from various events, such as (i) a beginning of an execution of a DMA task, DMA sub-task or DMA transaction, (ii) a reception of a DMA task request, (iii) an election of a DMA task request, and the like.

Timing counter 444 can be sampled and reloaded by the additional channel logic 448. In addition, the additional channel logic 444 can allow DMA task requests to be sent to the channel logic and arbiter 110 only if these DMA task requests are valid and/or can be serviced by the I/O port. In order to perform this task the additional channel logic 448 accesses various field in register file 200 and can conveniently access the buffer descriptors. For example, it accesses the DMA channel enable register 230, the DMA channel disable register 232, the DMA channel freeze register 234 and the like. A DMA task request that is received by a peripheral device or other memory mapped device and/or a request initiated by a FIFO out of FIFOs 150 can be masked by the additional channel logic 448 or can be provided to the arbiter 410.

According to an embodiment of the invention the additional channel logic 448 can detect a possible timing violation (and send a possible timing violation signal) by checking whether a DMA task was completed before the counter reaches a predefined value that indicates that the DMA task execution sub-interval has passed. The DMA task execution sub-interval can be included within the buffer file 200 or within a buffer descriptor. The signal can be sent to various components of device 90, including core 92 or to another portion of DMA controller 100.

The additional channel logic 448 can receive an indication from the selected DMA channel logic 420 or from a buffer descriptor that the DMA task was completed.

Selected DMA channel logic 460 manages the selected DMA task or sub-task. It accesses the buffer descriptor of the selected DMA task and performs various operations such as address calculation, determining when a DMA task or DMA task has ended, deciding when to perform an inter-buffer jump, and the like.

Selected DMA channel logic 460 includes at least one progress counter 462. The progress counter 462 is loaded with a base address once the DMA task begins and is decremented by the remaining size of data to be transferred during the DMA task or DMA sub-task by the DMA transaction size, when such a DMA transaction is completed. Once a DMA task or DMA sub-task ends the updated buffer descriptor is sent back to the PRAM 130 and to memory unit 94.

Conveniently, when managing a multidimensional buffer multiple counters should be used in order to count the repetition of each dimension.

Selected DMA channel logic 460 also includes an address calculation unit 464 that receives various addresses and uses these addresses to access selected entries of a buffer (pointed by the buffer descriptor), perform jump operations, and the like.

FIG. 8 illustrates various buffers 71, 72, 73, 74, 75, and 76 that are involved in a exemplary data transfer operation, according to an embodiment of the invention.

Buffers 71 and 72 stores a source image while registers 73 and 74 store a reference image. Data from both images is required when the source image is processed by encoding and/or compression.

Buffers 71 and 72 are the source buffers, buffers 73 and 74 are reference buffers, and buffers 75 and 76 are destination buffers. Each one of buffers 71 and 72 is a three-dimensional buffer.

The first dimension of buffer 71 includes a memory segment denoted S1. The second dimension of buffer 71 includes memory segments S1 and S2. The third dimension of buffer 71 includes fifty memory segments denoted S1-S50.

The first dimension of buffer 72 includes a memory segment denoted S51. The second dimension of buffer 72 includes memory segments S51 and S52. The third dimension of buffer 72 includes fifty memory segments denoted S51-S100.

The first dimension of buffer 73 includes a memory segment denoted R1. The second dimension of buffer 73 includes memory segments R1 and R2. The third dimension of buffer 73 includes fifty memory segments denoted R1-R50.

The first dimension of buffer 74 includes a memory segment denoted R51. The second dimension of buffer 74 includes memory segments R51 and R52. The third dimension of buffer 74 includes fifty memory segments denoted R51-R100.

The DMA controller 100 performs an inter-buffer jumping whenever it completes to read the second dimension of each buffer. Thus, after forty-eight jumps it completes reading buffers 71 and 72.

The result of the inter-buffer jumps the buffers stores the image data in a manner that eases the processing of the video frames. Thus, register 75 stores the following memory segments: S1, S2, S51, S52, S3, S4, S53, S54 . . . S100 and register 76 stores the following memory segments: R1, R2, R51, R52, R3, R4, R53, R54 . . . R100.

The following FIGs. are flow charts of various methods according to various embodiments of the invention. These methods are conveniently performed by system 90 of the present invention. References to various components of system 90 and especially of DMA controller 90 are provided only for convenience of explanation. Those of skill in the art, are able, based on the description herein, to apply method also to other systems Conveniently, stages of the various method can be combined, a stage of a certain method can be executed by applying one or more stages of another method. Some of these combinations are specifically described in the following description, but this is just for convenience of explanation.

Figure 9:
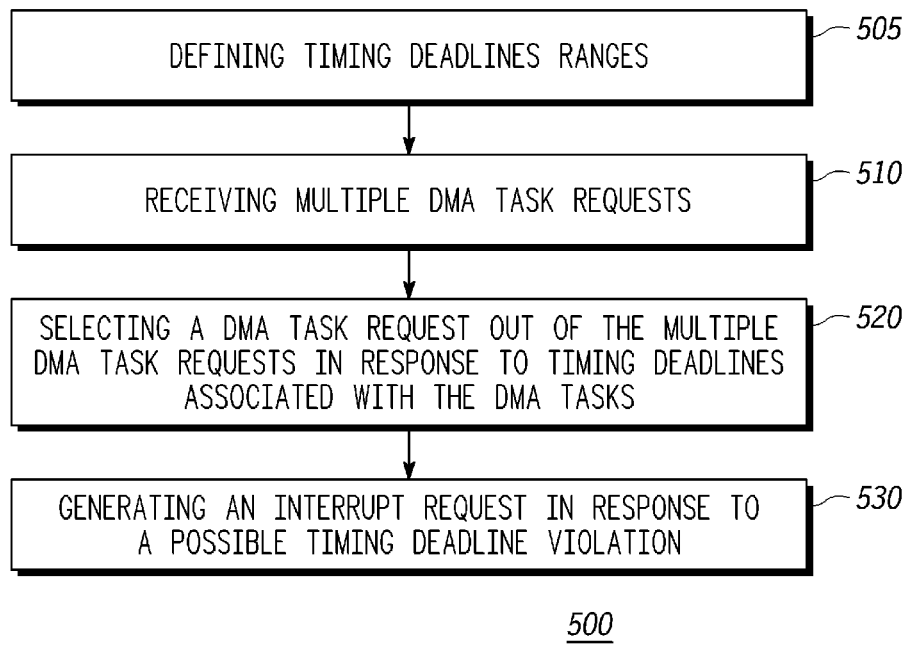
FIG. 9 is a flow chart of a method for arbitrating between multiple DMA task requests, according to an embodiment of the invention.

FIG. 9 is a flow chart of a method 500 for arbitrating between multiple DMA task requests, according to an embodiment of the invention.

Method 500 starts by optional stage 505 of defining timing deadlines ranges. The timing deadline ranges can be equal to each other but this is not necessarily so. The inventors used four timing deadline ranges that had different lengths.

Stage 505 is followed by stage 510 of receiving multiple DMA task requests. Conveniently, these DMA tasks requests are received at the channel logic and arbiter 110 from enabled DMA channels. The requests can be sampled during an arbitration cycle. Each DMA task request is described by a predefined buffer descriptor within the DMA channels BDT.

Stage 510 is followed by stage 520 of selecting a DMA task request out of the multiple DMA task requests in response to timing deadlines associated with the DMA tasks. The selection may be applied by arbiter 410.

According to an embodiment of the invention stage 520 includes selecting between DMA task requests associated with substantially same timing deadlines in response to predefined priority. This priority can be fixed or can dynamically change.

According to an embodiment of the invention the selection can include applying a timing deadline indifferent arbitration scheme.

Conveniently, stage 520 is responsive to at least one available bandwidth parameter and/or to at least one requested bandwidth parameter.

Conveniently, at least one DMA task is a repetitive task, and even a cyclic time based DMA task.

According to an embodiment of the invention stage 520 includes selecting between multiple DMA task requests that are associated with timing deadlines that belong to one (or more) timing deadline range. Conveniently, method 500 searches a range that is not empty and includes the shortest timing deadlines. If this range includes more than one DMA task request then method 500 selects one of these DMA task requests.

Conveniently, each DMA task request is associated with a certain I/O port. In such a case the method can perform an arbitration sequence for each port. The different arbitration schemes can be executed in parallel.

Conveniently, at least one DMA task involves retrieving information from (or to) a multidimensional buffer.

Conveniently, method 500 further includes monitoring the execution of the DMA tasks. Conveniently, method 500 includes stage 530 of generating an interrupt request in response to a possible timing deadline violation. It is noted that various stages of methods 600, 700 and/or 800 can be applied during the execution of that DMA task.

It is noted that method 500 can include a stage (not shown) of selecting another arbitration scheme such as a timing deadline indifferent arbitration mechanism.

Figure 10:
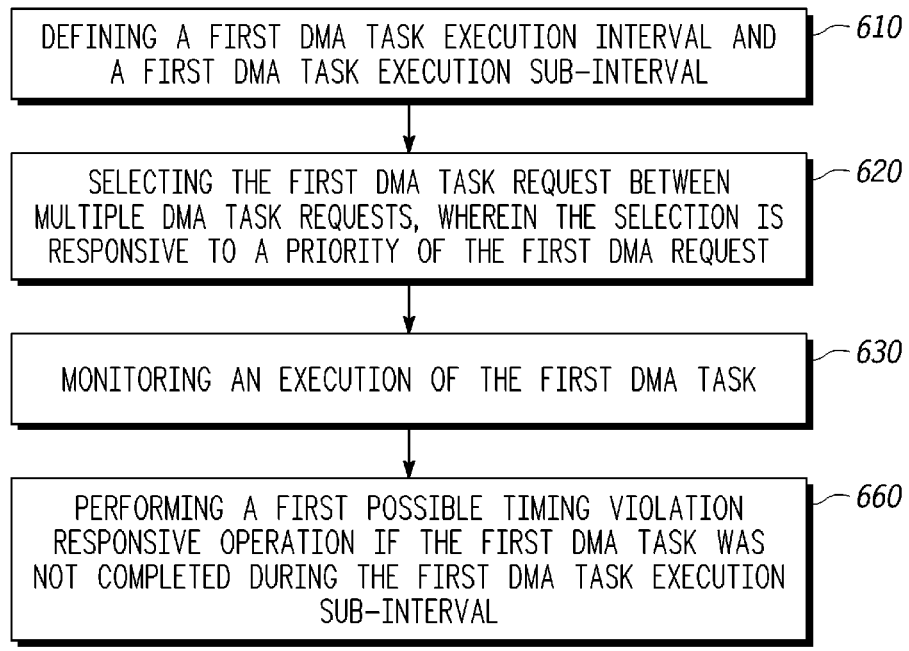
FIG. 10 is a flow chart of a method for controlling an execution of a first DMA task, according to an embodiment of the invention.

FIG. 10 is a flow chart of a method 600 for controlling an execution of a first DMA task, according to an embodiment of the invention.

According to an embodiment of the invention a core load is reduced by not generating an interrupt request once a DMA task was successfully completed.

Method 600 starts by stage 610 of defining a first DMA task execution interval and a first DMA task execution sub-interval. Conveniently these definitions are stored within one or more buffer descriptors.

Stage 610 is followed by stage 620 of selecting the first DMA task request between multiple DMA task requests, wherein the selection is responsive to a priority of the first DMA request. The selection can involve applying one or more stages of method 500.

Stage 620 is followed by stage 630 of monitoring an execution of the first DMA task.

Stage 630 is followed by stage 660 of performing a first possible timing violation responsive operation if the first DMA task was not completed during the first DMA task execution sub-interval.

According to various embodiments of the invention the method 600 can be applied to multiple DMA tasks. For example, method 600 can include defining a second DMA task execution interval and a second DMA task execution sub-interval, monitoring an execution of the second DMA task and performing a second possible timing violation responsive operation if a second DMA task was not completed during a second DMA task execution sub-interval.

According to an embodiment of the invention the first DMA task is a cyclic time based DMA task. Once a possible timing violation is detected then the execution of the DMA tasks during future DMA task intervals can be altered.

According to various embodiments of the invention stage 660 can include either one of the following stages or a combination of one or more of the following stages: (i) generating an interrupt request; (ii) stopping the DMA task; (iii) altering a priority of the first DMA task request; (iv) allowing an execution of multiple first DMA tasks within a single first DMA task execution interval; (v) forcing a completion of the DMA task; (vi) forcing a completion of a DMA sub-task.

Referring to the DMA controller 100 that was illustrated in previous FIGs, the DMA controller 100 can bypass the arbiter or otherwise temporarily freeze other DMA requests and cause the DMA task request to be provided to the I/O port interface again.

According to an embodiment of the invention the possible timing violation responsive operation is responsive to the progress of the DMA task that caused the possible timing violation and/or to the priority of that DMA task. For example if the DMA task is almost completed (and/or has a high priority) the method will tend to complete the DMA task and not to stop it.

Figure 11:
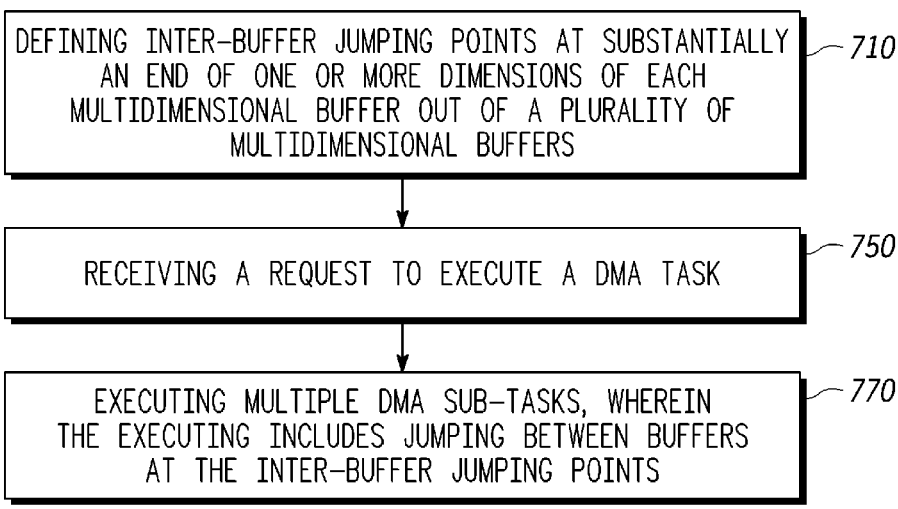
FIG. 11 is a flow chart of a method for executing a DMA task, according to an embodiment of the invention.

FIG. 11 is a flow chart of a method 700 for executing a DMA task, according to an embodiment of the invention.

Method 700 starts by stage 710 of defining inter-buffer jumping points at substantially an end of one or more dimensions of each multidimensional buffer out of a plurality of multidimensional buffers.

Stage 710 is followed by stage 750 of receiving a request to execute a DMA task.

Stage 750 is followed by stage 770 of executing multiple DMA sub-tasks, wherein the executing includes jumping between buffers at the inter-buffer jumping points.

Conveniently stage 770 includes determining, in at least one inter-buffer jumping point, whether to continue executing DMA sub-tasks. Thus method 700 can continue to execute the DMA task, abort the task or even re-execute at least one DMA sub-task in response to the determination.

According to various embodiments of the invention the determination can be (i) responsive to a success of DMA sub-tasks that were executed prior to the determining; (ii) responsive to a content of data retrieved during at least one DMA sub-tasks that was executed prior to the determining, and the like.

Conveniently, method 700 includes freezing at least one DMA channel during the determination.

Conveniently the DMA task is a time based cyclic DMA task.

Conveniently, the DMA task includes writing data from a multidimensional buffer to multiple single dimensional buffers.

Conveniently, method 700 includes executing a DMA sub-task associated with a certain dimension of each of the plurality of multidimensional buffers and then executing DMA sub-tasks associated with another dimension of each of the plurality of multidimensional buffers.

Conveniently the DMA task is executed once a corresponding DMA task request is selected. The selection can be responsive to a priority of the DMA tasks. Conveniently, a priority of a DMA task associated with a plurality of multidimensional buffers is responsive to a priority of at least one of these multidimensional buffers.

Figure 12:
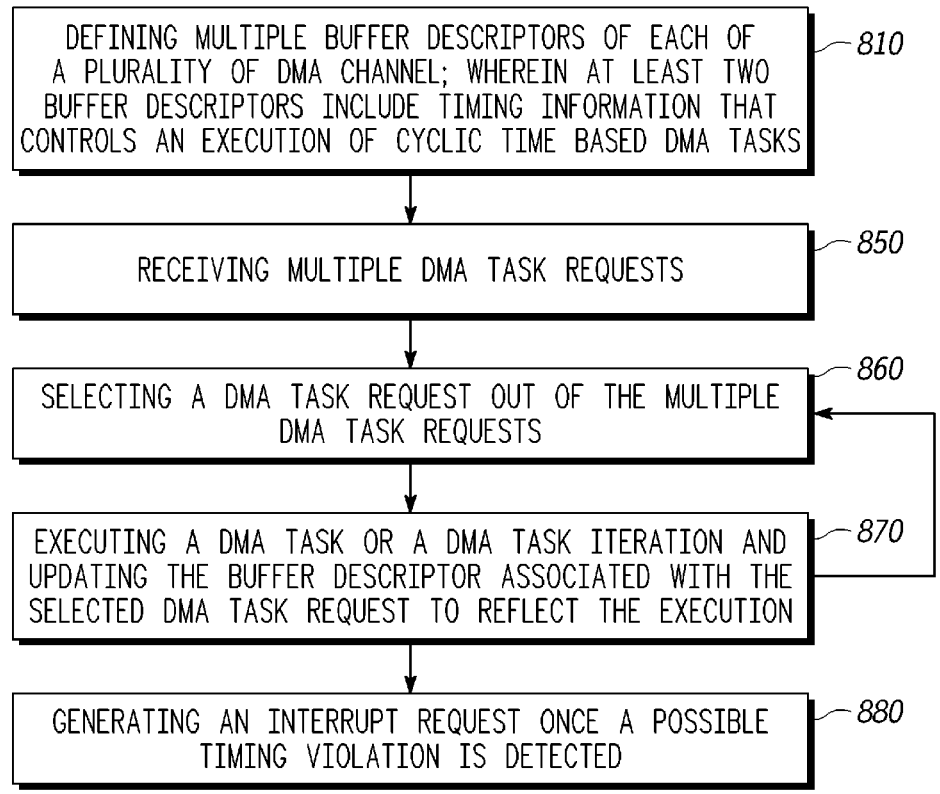
FIG. 12 is a flow chart of a method for controlling multiple DMA tasks, according to an embodiment of the invention.

FIG. 12 is a flow chart of a method 800 for controlling multiple DMA tasks, according to an embodiment of the invention.

Method 800 starts by stage 810 of defining multiple buffer descriptors for each of a plurality of DMA channel; wherein at least two buffer descriptors include timing information that controls an execution of cyclic time based DMA tasks. Examples of various information included within a buffer descriptor are illustrated in FIG. 5.

Conveniently, the timing information defines a DMA task execution interval and a DMA task priority. These fields can be utilized by a method such as method 600. Conveniently, at least one buffer descriptor includes a current iteration I/O port selection information and a next iteration I/O port selection information. If the DMA controller (such as DMA controller 100) includes multiple I/O ports then these fields define the I/O port that should be used during a current DMA task, DMA sub-task and/or DMA transaction and the I/O port that should be used during the next DMA task, DMA sub-task and/or DMA transaction. Conveniently, at least one buffer descriptor includes arbitration type information. Thus, in view of this field the DMA controller can select an arbitration scheme, such as but not limited to the arbitration schemes of method 500.

Stage 810 is followed by stage 850 of receiving multiple DMA task requests.

Stage 850 is followed by stage 860 of selecting a DMA task request out of the multiple DMA task requests. The selection can include any stage of method 500.

Stage 860 is followed by stage 870 of executing a DMA task or a DMA task iteration and updating the buffer descriptor associated with the selected DMA task request to reflect the execution. Stage 870 is followed by stage 860.

Conveniently, stage 870 is followed by stage 880 of generating an interrupt request once a possible timing violation is detected. Stage 880 and a possible timing violation operation are followed by stage 860.

It is noted that the buffer descriptors can be updated during the execution of method 800, although this update stage is not illustrated in FIG. 11 for convenience of explanation.

Conveniently, at least one buffer descriptor is stored in a memory unit that is coupled to a DMA controller and the execution of a first iteration of a cyclic time based DMA task includes retrieving a buffer descriptor associated with the cyclic time based DMA task from the memory unit.

Conveniently, at least one cyclic time based DMA tasks includes multiple DMA sub tasks associated with multidimensional buffers. Conveniently, the method 800 includes utilizing different I/O ports during different DMA task iterations.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for arbitrating between direct memory access (DMA) task requests, the method comprises:
   defining a plurality of timing deadline ranges, each timing deadline range comprising a plurality of timing deadlines;
   receiving multiple DMA task requests, wherein each DMA task request includes a current counter field for storing a current value of a timing counter, and a threshold field for storing a threshold value, wherein the threshold value reflects a value of the timing counter when the associated DMA task is due, and wherein a difference between the current value of the timing counter and the threshold value represents a timing deadline for the associated DMA task;
   sorting the multiple DMA task requests into the plurality of timing deadline ranges based upon the timing deadlines associated with the respective DMA tasks;
   selecting a first DMA task request out of the multiple DMA task requests, wherein the selecting includes selecting one of a plurality of DMA task requests associated with a particular timing deadline range;
   determining that a first timing deadline of the first DMA task has passed, wherein the first timing deadline occurs prior to a time when the current value of the timing counter for the first DMA task equals the threshold value for the first DMA task; and
   increasing a priority of the first DMA task in response to determining that the first timing deadline has passed;
   wherein at least one DMA task is a cyclic time based DMA task that has a repetition rate that is limited by a DMA task execution period.

2. The method according to claim 1 wherein each DMA task request of the plurality of DMA task requests associated with the particular timing deadline range has substantially a same timing deadline.

3. The method according to claim 1, wherein at least one DMA task request of the plurality of DMA task requests is a cyclic time based DMA task, wherein only a single cyclic time based DMA task is executed during a single DMA task execution period.

4. The method according to claim 1, wherein each DMA task is associated with an I/O port and wherein the selecting comprises arbitrating between DMA task requests that are associated to the same I/O port.

5. The method according to claim 1, wherein at least one DMA task request involves retrieving information from a multidimensional buffer; wherein each dimension of the multidimensional buffer is associated with a different DMA sub task of the DMA task.

6. The method according to claim 1, further comprising generating an interrupt at an end of a DMA task execution sub-interval, in response to a possible timing deadline violation, wherein the possible timing deadline violation is detected, before a timing violation occurred, if a DMA task that was expected to be completed during a DMA task execution interval was not completed during the DMA task execution sub-interval.

7. A device that comprises:
an interface that is adapted to:
define a plurality of timing deadline ranges, each timing deadline range comprising a plurality of timing deadlines; and
receive multiple direct memory access (DMA) task requests, wherein each DMA task includes a current counter field for storing a current value of a timing counter, and a threshold for storing a threshold value, wherein the threshold value reflects a value of the timing counter when the associated DMA task is due, and wherein a difference between the current value of the timing counter and the threshold value represents a timing deadline for the associated DMA task;
an arbiter that is adapted to:
sort the multiple DMA task requests into the plurality of timing deadline ranges in response to the timing deadlines associated with the respective DMA tasks;
select a first DMA task request out of the multiple DMA task requests, wherein in selecting, the arbiter is further adapted to select one of a plurality of DMA task requests associated with a particular timing deadline range of the plurality of timing deadline ranges;
determine that a first timing deadline of the first DMA task has passed, wherein the first timing deadline occurs prior to a time when the current value of the timing counter for the first DMA task equals the threshold value for the first DMA task; and
increase a priority of the first DMA task in response to determining that the first timing deadline has passed.

8. The device according to claim 7 wherein each DMA task request of the plurality of DMA task requests associated with the particular timing deadline range has substantially a same timing deadline.

9. The device according to claim 7, wherein at least one DMA task request of the plurality of DMA task requests is a cyclic time based DMA task, wherein only a single cyclic time based DMA task is executed during a single DMA task execution period.

10. The device according to claim 7, wherein at least one DMA task request involves retrieving information from a multidimensional buffer; wherein each dimension of the multidimensional buffer is associated with a different DMA sub task of the DMA task.

11. The device according to claim 7, further adapted to generate an interrupt at an end of a DMA task execution sub-interval, in response to a possible timing deadline violation, wherein the possible timing deadline violation is detected, before a timing violation occurred, if a DMA task that was expected to be completed during a DMA task execution interval was not completed during the DMA task execution sub-interval.

12. The device according to claim 7, comprising multiple ports and wherein the arbiter is adapted to arbitrate between DMA tasks associated with a single port.

13. The method according to claim 1, further comprising allowing, in response to a possible timing deadline violation, more than a single DMA cyclic time based DMA task to be executed during a next DMA task execution period.

14. The device according to claim 7, further adapted to allow, in response to a possible timing deadline violation, more than a single DMA cyclic time based DMA task to be executed during a next DMA task execution period.

15. The method according to claim 1 wherein the selected DMA task request has other than a shortest timing deadline of the plurality of DMA task requests.

16. The device according to claim 7 wherein the selected DMA task request has other than a shortest timing deadline of the plurality of DMA task requests.

17. The method according to claim 1, wherein:
each DMA task further includes a base counter field that includes a base counter value that is loaded to the current counter field when the associated DMA task is initialized; and
each DMA task has an associated DMA task execution period that is defined as a first difference between an associated base counter value and an associated timing deadline.

18. The method according to claim 1, further comprising:
forcing an execution of the first DMA task in further response to determining that the first timing deadline has passed.

19. The device according to claim 7, wherein:
each DMA task further includes a base counter field that includes a base counter value that is loaded to the current counter field when the associated DMA task is initialized and a third timing field that includes a current time value; and
each DMA task has an associated DMA task execution period that is defined as a first difference between an associated base counter value and an associated timing deadline.

* * * * *

UNITED STATES PATENT AND TRADEMARK OFFICE
CERTIFICATE OF CORRECTION

| | | |
|---|---|---|
| PATENT NO. | : 8,572,296 B2 | Page 1 of 1 |
| APPLICATION NO. | : 11/994270 | |
| DATED | : October 29, 2013 | |
| INVENTOR(S) | : Uri Shasha et al. | |

It is certified that error appears in the above-identified patent and that said Letters Patent is hereby corrected as shown below:

In the Specification

Column 6, Line 44, change "controller 100 include" to be --controller 100 includes--

Column 9, Line 31, change "such as ED" to be --such as BD--

Column 12, Line 34, change "buffers 71 and 72 stores" to be --buffers 71 and 72 store--

Signed and Sealed this
Second Day of September, 2014

Michelle K. Lee
*Deputy Director of the United States Patent and Trademark Office*